(12) United States Patent
Park

(10) Patent No.: US 9,720,492 B2
(45) Date of Patent: *Aug. 1, 2017

(54) METHOD OF DYNAMICALLY SCALING A POWER LEVEL OF A MICROPROCESSOR

(71) Applicant: SAMSUNG ELECTRONICS CO., LTD., Suwon-si (KR)

(72) Inventor: Jong-Lae Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/962,416

(22) Filed: Dec. 8, 2015

(65) Prior Publication Data

US 2016/0091962 A1    Mar. 31, 2016

Related U.S. Application Data

(63) Continuation of application No. 14/152,401, filed on Jan. 10, 2014, now Pat. No. 9,239,614, which is a continuation of application No. 12/911,798, filed on Oct. 26, 2010, now Pat. No. 8,631,262.

(30) Foreign Application Priority Data

Nov. 6, 2009 (KR) ......................... 10-2009-0106822

(51) Int. Cl.
*G06F 1/32* (2006.01)
*G06F 1/00* (2006.01)

(52) U.S. Cl.
CPC .......... *G06F 1/3296* (2013.01); *G06F 1/3203* (2013.01); *G06F 1/324* (2013.01); *Y02B 60/1217* (2013.01); *Y02B 60/1285* (2013.01); *Y02B 60/32* (2013.01)

(58) Field of Classification Search
CPC ..................................................... G06F 1/3203
USPC ........................................................ 713/320
See application file for complete search history.

(56) References Cited

U.S. PATENT DOCUMENTS

| 5,719,800 A | 2/1998 | Mittal et al. |
| 7,272,517 B1 | 9/2007 | Brey et al. |
| 7,549,075 B2 | 6/2009 | He et al. |

(Continued)

FOREIGN PATENT DOCUMENTS

| CN | 101162405 A | 4/2008 |
| CN | 101529361 B | 11/2012 |

(Continued)

OTHER PUBLICATIONS

Communication dated Dec. 16, 2015, issued by the Korean Intellectual Property Office in corresponding Korean Application No. 10-2009-0106822.

(Continued)

*Primary Examiner* — Suresh Suryawanshi
(74) *Attorney, Agent, or Firm* — Sughrue Mion, PLLC

(57) ABSTRACT

A power management device includes a workload rate detector configured to adjust a length of a duration period; a power management unit configured to calculate a period workload rate in the duration period; and a voltage-clock provider configured to adjust a power level, based on the period workload rate and/or based on an external command.

20 Claims, 18 Drawing Sheets

(56) References Cited

U.S. PATENT DOCUMENTS

| | | | |
|---|---|---|---|
| 7,577,770 B2 * | 8/2009 | Tanaka | G06F 11/3419 710/14 |
| 7,685,446 B2 | 3/2010 | Hong et al. | |
| 7,689,851 B2 | 3/2010 | Sawyers et al. | |
| 7,761,874 B2 | 7/2010 | Bodas | |
| 7,971,073 B2 | 6/2011 | Hsu et al. | |
| 8,051,310 B2 | 11/2011 | He et al. | |
| 8,224,497 B2 | 7/2012 | Fong et al. | |
| 8,245,057 B2 | 8/2012 | Lyu | |
| 8,589,875 B2 * | 11/2013 | Brenneman | G06F 8/20 717/120 |
| 8,707,060 B2 | 4/2014 | Rotem et al. | |
| 9,459,679 B2 * | 10/2016 | Burchard | G06F 1/3203 |
| 2006/0242433 A1 | 10/2006 | Fu et al. | |
| 2006/0253715 A1 | 11/2006 | Ghiasi et al. | |
| 2007/0168055 A1 | 7/2007 | Hsu et al. | |
| 2008/0098254 A1 | 4/2008 | Altevogt et al. | |
| 2009/0049314 A1 | 2/2009 | Taha et al. | |
| 2011/0093734 A1 | 4/2011 | Burchard et al. | |

FOREIGN PATENT DOCUMENTS

| | | |
|---|---|---|
| JP | 11-224233 A | 8/1999 |
| JP | 2009-521761 A | 6/2009 |
| WO | 2007/056705 A2 | 5/2007 |

OTHER PUBLICATIONS

Communication dated Jul. 3, 2014 issued by the State Intellectual Property Office of P.R. China in counterpart Chinese Application No. 201010543574.5.

* cited by examiner

METHOD OF DYNAMICALLY SCALING A POWER LEVEL OF A MICROPROCESSOR

CROSS-REFERENCE TO RELATED APPLICATION

This application is a Continuation of U.S. patent application Ser. No. 14/152,401, filed on Jan. 10, 2014, which is a Continuation of application Ser. No. 12/911,798, filed on Oct. 26, 2010, which claims priority from Korean Patent Application No. 10-2009-0106822, filed on Nov. 6, 2009 in the Korean Intellectual Property Office (KIPO), the contents of which are incorporated herein in their entireties by reference.

FIELD

Exemplary embodiments relate to an electric device, and more particularly to a method of dynamically scaling a power level of a microprocessor in an electric device.

SUMMARY

Recent electric devices consume high power because a microprocessor in the electric device operates based on a high operation frequency and/or a high operation voltage. The high power consumption is one of problems for a mobile electric device having a limited capacity battery. Thus, a dynamic voltage and frequency scaling (DVFS) technique by which operation frequency and/or operation voltage of the microprocessor is changed based on operation modes (e.g., an active mode and an idle mode) of the electric device has been suggested. In the DVFS technique, a power level of the microprocessor may be changed by monitoring a period workload rate in a current duration period, and by predicting the power level of the microprocessor for a future duration period based on the period workload rate in the current duration period. However, the power level of the microprocessor for the future duration period may be inaccurately predicted when the current duration period is relatively long. In addition, power consumption and performance degradation of the microprocessor due to unnecessary power level changes may be caused when the current duration period is relatively short.

Exemplary embodiments provide a method of dynamically scaling a power level of a microprocessor by which the power level of the microprocessor for a future duration period may be accurately predicted, and power consumption and performance degradation of the microprocessor due to unnecessary power level changes may be prevented.

According to an aspect of an exemplary embodiment, there is provided a method including: receiving a plurality of workload rates of a microprocessor in a first duration period; determining a second duration period by adjusting a length of the first duration period; calculating a period workload rate based on the plurality of workload rates in the first duration period; dynamically scaling a power level of the microprocessor; and maintaining the scaled power level of the microprocessor in the second duration period.

The power level of the microprocessor may correspond to at least one of an operation frequency of the microprocessor or an operation voltage of the microprocessor.

The method may further include calculating a variation of the plurality of workload rates of the microprocessor.

The calculating the variation of the plurality of workload rates of the microprocessor may include: calculating an active period in each of unit periods in the first duration period; calculating an idle period in each of the unit periods in the first duration period; and calculating a unit workload rate based on the active period and the idle period in each of the unit periods in the first duration period, wherein the active period corresponds to a period in which a main clock signal is applied to the microprocessor; and the idle period corresponds to a period in which the main clock signal is not applied to the microprocessor.

The active period and the idle period may be determined by an operating system (OS).

The operating system (OS) may be linux.

The determining the second duration period by adjusting the length of the first duration period may include non-linearly decreasing the length of the first duration period when the variation of the plurality of workload rates is greater than a stable reference value; non-linearly increasing the length of the first duration period when the variation of the plurality of workload rates is less than the stable reference value; and maintaining the length of the first duration period when the variation of the plurality of workload rates is equal to or substantially the same as the stable reference value.

The length of the first duration period may be adjusted exponentially.

The length of the first duration period may be changed between a predetermined maximum period length and a predetermined minimum period length.

The dynamically scaling the power level of the microprocessor may include increasing the power level of the microprocessor when the period workload rate is greater than an up-reference value; decreasing the power level of the microprocessor when the period workload rate is less than a down-reference value; and maintaining the power level of the microprocessor when the period workload rate is between the up-reference value and the down-reference value.

A first discrete power level of a plurality of discrete power levels may be two times greater than a second discrete power level of the plurality of discrete power levels.

The method may further include adjusting the power level of the microprocessor to a predetermined power level when an external input is received.

The method may further include adjusting the power level of the microprocessor based on the period workload rate in the first duration period.

The method may further include adjusting the length of the first duration period to a predetermined period length when an external input is received.

The method may further include adjusting the length of the first duration period based on the variation of the plurality of workload rates in the first duration period.

According to an aspect of another exemplary embodiment, there is provided a non-transitory computer readable recording medium having recorded thereon a program executable by a computer for performing the above method.

According to an aspect of another exemplary embodiment, there is provided a device including: a microprocessor; a workload rate detector which outputs a workload rate of the microprocessor and a length of a duration period; a power management unit which calculates a period workload rate based on the workload rate of the microprocessor and the length of the duration period output by the workload rate detector; and a voltage-clock provider which controls to change a power level of the microprocessor based on the calculated period workload rate.

The workload rate detector may monitor an operation state of the microprocessor in order to output the workload rate of the microprocessor and the length of the duration period.

The power management unit may output a level control signal for changing the power level of the microprocessor based on the calculated period workload rate, and the voltage-clock provider may control to change the power level of the microprocessor based on the level control signal output by the power management unit.

The voltage-clock provider may control to change the power level of the microprocessor by adjusting at least one of a main clock signal output by the voltage-clock provider to the microprocessor and a magnitude of a main power voltage output by the voltage-clock provider to the microprocessor.

BRIEF DESCRIPTION OF THE DRAWINGS

Illustrative, non-limiting exemplary embodiments will be more clearly understood from the following detailed description taken in conjunction with the accompanying drawings in which.

DETAILED DESCRIPTION OF EXEMPLARY EMBODIMENTS

Figure 1:
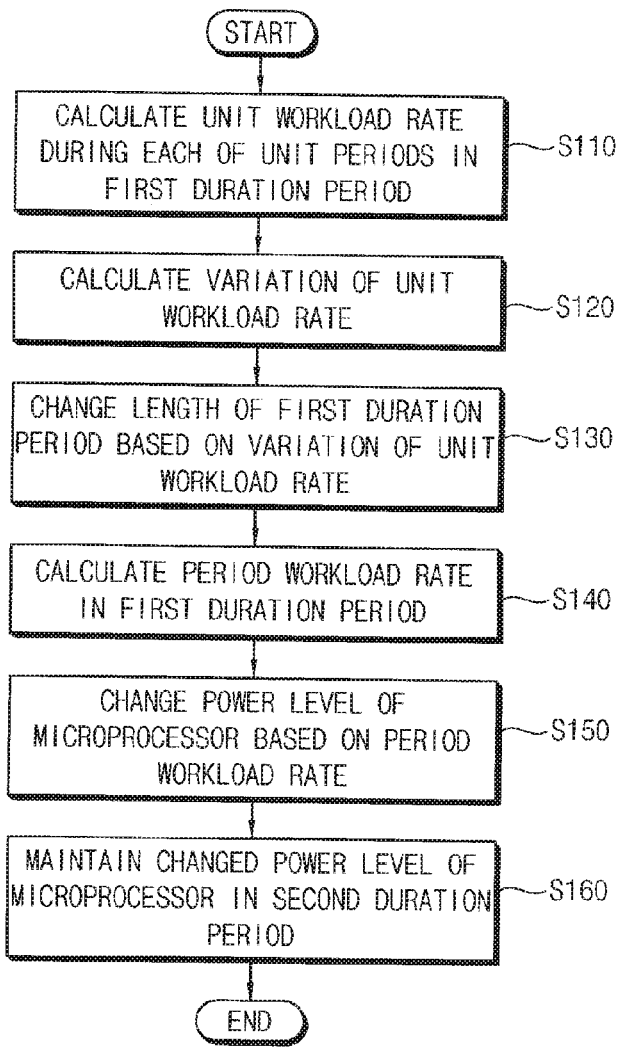
FIG. 1 is a flow chart illustrating a method of dynamically scaling a power level of a microprocessor according to an exemplary embodiment.

Various exemplary embodiments will be described more fully hereinafter with reference to the accompanying drawings. The present inventive concept may, however, be embodied in many different forms and should not be construed as limited to the exemplary embodiments set forth herein. Rather, these exemplary embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third, etc., may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of dynamically scaling a power level of a microprocessor according an exemplary embodiment. Referring to FIG. 1, in the method of dynamically scaling the power level of the microprocessor, a unit workload rate may be calculated during each of unit periods in a first duration period (operation S110). Variation of the unit workload rate may be calculated based on the unit workload rate (operation S120). A length of the first duration period may be exponentially changed based on the variation of the unit workload rate (operation S130). A period workload rate may be calculated by accumulating the unit workload rate in the first duration period (operation S140). The power level of the microprocessor may be changed based on the period workload rate (operation S150). In addition, the changed power level of the microprocessor may be maintained in a second duration period (operation S160).

In the method of dynamically scaling the power level of the microprocessor, the power level (e.g., an operation frequency and/or an operation voltage) of the microprocessor may be changed based on a period workload rate in a current duration period. That is, the power level of the microprocessor for a future duration period may be determined based on the period workload rate in the current duration period. In detail, the power level of the microprocessor is predicted by assuming that the period workload rate in the future duration period will be similar to the period workload rate in the current duration period. Here, the power level of the microprocessor is increased when the power level of the microprocessor is determined to be relatively low, so that the microprocessor may operate with high performance. In addition, the power level of the microprocessor is decreased when the power level of the microprocessor is determined to be relatively high, so that the microprocessor may consume low power. However, in related art DVFS techniques, a length of a duration period is fixed, or linearly changed, so that the length of the duration period may not reflect an operation state of the microprocessor. On the other hand, in the method of dynamically scaling the power level of the microprocessor, the length of the duration period is exponentially changed, so that the length of the duration period may accurately reflect the operation state of the microprocessor.

The unit workload rate may be calculated during each of the unit periods in the first duration period (operation S110). The first duration period may correspond to the current duration period. The period workload rate may be calculated by accumulating the unit workload rate in the first duration period (operation S140). The power level of the microprocessor may be changed based on the period workload rate (operation S150). In addition, the changed power level of the microprocessor may be maintained in the second duration period (operation S160). The second duration period may correspond to the future duration period. In an exemplary embodiment, the second duration period may be consecutive to the first duration period. Here, the variation of the unit workload rate may be calculated by subtracting a previous unit workload rate (e.g., a first unit workload rate) from a next unit workload rate (e.g., a second unit workload rate) in the first duration period (operation S120). Accordingly, the length of the first duration period may be exponentially changed based on the variation of the unit workload rate (operation S130). In an exemplary embodiment, the unit workload rate may be defined as a ratio of an actual workload that the microprocessor performs during a specific unit period in relation to a maximum workload that the microprocessor is able to perform during the specific unit period. In addition, the period workload rate may be defined as a ratio of an actual workload that the microprocessor performs during a specific duration period in relation to a maximum workload that the microprocessor is able to perform during the specific duration period. Hereinafter, a method of dynamically scaling the power level of the microprocessor will be described in detail.

The unit workload rate may be calculated during each of the unit periods in the first duration period (operation S110). Here, the length of the unit period has a fixed value that is determined by systems or users whereas the length of the first duration period has a variable value that continues to be exponentially changed based on the variation of the unit workload rate. For example, the length of the unit period may be determined based on a system tick. In an exemplary embodiment, after an active period and an idle period are calculated in each of the unit periods, the unit workload rate may be estimated based on the active period and the idle period in each of the unit periods. The active period may correspond to a period in which a main clock signal is applied to the microprocessor. The idle period may correspond to a period in which the main clock signal is not applied to the microprocessor. The active period and the idle period may be determined by an operating system (OS) such as Linux, Windows, etc. For example, after the operating system determines the idle period in a specific unit period, the active period in the specific unit period may be determined by subtracting the idle period from the specific unit period.

The variation of the unit workload rate may be calculated (operation S120) after the unit workload rate is calculated during each of the unit periods in the first duration period (operation S110). In an exemplary embodiment, the variation of the unit workload rate may correspond to a value generated by subtracting the previous unit workload rate (i.e., a unit workload rate calculated during the (n)th unit period from the next unit workload rate that is a unit workload rate calculated during the (n+1)th unit period) in the first duration period. While the variation of the unit workload rate is sequentially calculated (operation S120), the length of the first duration period may be exponentially changed based on the variation of the unit workload rate (operation S130). As described above, the length of the first duration period may be exponentially changed based on every variation of the unit workload rate. Alternatively, the length of the first duration period may be exponentially changed based on some variations of the unit workload rate by user settings. For example, the length of the first duration period may be exponentially changed based on every odd variation of the unit workload rate, or based on every even variation of the unit workload rate. In an exemplary embodiment, the length of the first duration period may be exponentially decreased when the variation of the unit workload rate is greater than a stable reference value, the length of the first duration period may be exponentially increased when the variation of the unit workload rate is less than the stable reference value, and the length of the first duration period may be maintained when the variation of the unit workload rate is equal to or substantially the same as the stable reference value. Here, the stable reference value may be variously determined based on conditions for systems.

Typically, the operation state of the microprocessor is determined to be unstable when the variation of the unit workload rate is relatively big (i.e., when the operation state of the microprocessor is rapidly changed in the first duration period). In this case, if the length of the first duration period is relatively long, the first duration period may not accurately reflect the operation state of the microprocessor. As a result, an overshoot may be generated when the predicted power level of the microprocessor for the second duration period is relatively high compared to an actual period workload rate in the second duration period. In addition, an undershoot may be generated when the predicted power level of the microprocessor for the second duration period is relatively low compared to the actual period workload rate in the second duration period. On the other hand, the operation state of the microprocessor is determined to be stable when the variation of the unit workload rate is relatively small (i.e., when the operation state of the microprocessor is gradually changed in the first duration period). In this case, if the length of the first duration period is relatively short, unnecessary power level changes may be performed. As a result, power consumption and performance degradation of the microprocessor due to the unnecessary power level changes may be caused. Therefore, in order to overcome these problems, a method of dynamically scaling the power level of the microprocessor according to an exemplary embodiment may exponentially decrease the first duration period when the operation state of the microprocessor is unstable in the first duration period, and may exponentially increase the first duration period when the operation state of the microprocessor is stable in the first duration period.

The period workload rate may be calculated by accumulating the unit workload rate in the first duration period (operation S140). In an exemplary embodiment, the period workload rate may be calculated by accumulating the unit workload rate in the first duration period while applying weight to the unit workload rate. For example, a relatively big weight may be applied to the unit workload rate that is calculated later, and a relatively small weight may be applied to the unit workload rate that is calculated earlier. However, it may be a heavy burden on mobile systems such as mobile communication terminals to apply the weight to the unit workload rate. Thus, when the period workload rate is calculated by accumulating the unit workload rate in the first duration period, it applying the weight to the unit workload rate in the first duration period may be selectively performed according to system characteristics.

The power level of the microprocessor indicates how much power the microprocessor consumes. Thus, the power level of the microprocessor may correspond to the operation frequency and/or the operation voltage of the microprocessor. That is, a relatively high power level of the microprocessor may indicate that the microprocessor uses a relatively high operation frequency and/or a relatively high operation voltage. For example, when the power level (i.e., the operation frequency and/or the operation voltage) of the microprocessor is relatively high, it may be determined that the microprocessor consumes a relatively high power to operate with a high speed. Thus, providing the microprocessor with a clock signal having a relatively high frequency and/or a power voltage having a relatively high level as compared to the actual period workload rate may result in unnecessary power consumption. Typically, the operation frequency of the microprocessor is related to the operation voltage of the microprocessor. As a result, as the operation frequency of the microprocessor increases, the operation voltage of the microprocessor may also increase. Similarly, as the operation voltage of the microprocessor increases, the operation frequency of the microprocessor may also increase.

The power level of the microprocessor may be changed based on the period workload rate (operation S150). In an exemplary embodiment, the power level of the microprocessor may be increased when the period workload rate in the first duration period is greater than an up-reference value, the power level of the microprocessor may be decreased when the period workload rate in the first duration period is less than a down-reference value, and the power level of the microprocessor may be maintained when the period workload rate in the first duration period is between the up-reference value and the down-reference value. In an exemplary embodiment, the power level of the microprocessor may be changed by sequentially selecting one among a plurality of discrete power levels. Here, one of the discrete power levels may be two times greater than another of the discrete power levels. For example, the power level of the microprocessor may be changed by sequentially selecting one among a plurality of discrete operation frequencies (e.g., 500 MHz, 250 MHz, 125 MHz). That is, the operation frequency of the microprocessor may be sequentially increased (e.g., 125 MHz-250 MHz-500 MHz), and the operation frequency of the microprocessor may be sequentially decreased (e.g., 500 MHz-250 MHz-125 MHz). It is understood that the discrete power levels are not limited thereto, and the number, the value, etc., of the discrete power levels may be variously determined based on, for example, conditions for the microprocessor. In an exemplary embodiment, the power level of the microprocessor may be changed by gradually adjusting (i.e., increasing or decreasing) the power level of the microprocessor. The operation frequency and the operation voltage of the microprocessor may be changed together.

The changed power level of the microprocessor may be maintained in the second duration period that is consecutive to the first duration period (operation S160). As with the first duration period, the second duration period may be exponentially changed based on the variation of the unit workload rate calculated in the second duration period. In an exemplary embodiment, the changed power level of the microprocessor may be changed to a predetermined power level, or may be adjusted (i.e., increased or decreased) by a predetermined value when an external command is input. That is, when it is inadequate to maintain the changed power level of the microprocessor in the second duration period (e.g., when the overshoot or the undershoot is excessively caused), the changed power level of the microprocessor may be changed to a predetermined power level, or may be adjusted (i.e., increased or decreased) by a predetermined value based on an external command. In an exemplary embodiment, the length of the first duration period may be changed to a predetermined period length, or may be adjusted by a predetermined value based on conditions for the microprocessor to execute an application when an external command is input. As described above, the method of dynamically scaling the power level of the microprocessor may accurately predict the power level of the microprocessor for the future duration period (i.e., the second duration period), and may prevent power consumption and performance degradation of the microprocessor due to unnecessary power level changes by exponentially changing the length of the current duration period (i.e., the first duration period) based on the variation of the unit workload rate calculated during each of the unit periods in the current duration period.

Figure 2:
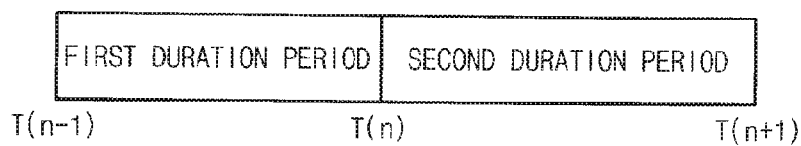
FIG. 2 is a diagram illustrating a plurality of duration periods used in a method according to an exemplary embodiment.

FIG. 2 is a diagram illustrating a plurality of duration periods used in a method according to an exemplary embodiment. Referring to FIG. 2, the first duration period may correspond to a period from a first timing point T(n−1) to a second timing point T(n). The second duration period may correspond to a period from the second timing point T(n) to a third timing point T(n+1). As described above, the length of the first duration period may be exponentially changed based on the variation of the unit workload rate in the first duration period. The length of the second duration period may be exponentially changed based on the variation of the unit workload rate in the second duration period. That is, the length of the first duration period and the length of the second duration period are variable values that are exponentially changed based on the operation state of the microprocessor. Thus, the first through third timing points T(n−1), T(n), and T(n+1) may move from side to side as time passes.

In the method of FIG. 1, the power level of the microprocessor for the second duration period may be determined based on the period workload rate in the first duration period. As described above, the power level of the microprocessor for the second duration period is predicted by assuming that the period workload rate in the second duration period will be similar to the period workload rate in the first duration period. In an exemplary embodiment, the power level of the microprocessor for the second duration period may be determined by adjusting (i.e., increasing or decreasing) the power level of the microprocessor for the first duration period. In related art DVFS techniques, the length of the duration period may not reflect the operation state of the microprocessor in the duration period because the length of the duration period is fixed or linearly changed. As a result, the related art DVFS techniques may inaccurately predict the power level of the microprocessor for the future duration period if the duration period is relatively long. In addition, the related art DVFS techniques may cause power consumption and performance degradation of the microprocessor due to unnecessary power level changes.

On the other hand, in a method of dynamically scaling a power level of a microprocessor according an exemplary embodiment, the unit workload rate may be calculated during each of the unit periods in the first duration period, and the length of the first duration period may continue to be exponentially changed based on the variation of the unit workload rate. As a result, the method according an exemplary embodiment may accurately predict the power level of the microprocessor for the second duration period by exponentially decreasing the length of the first duration period when the operation state of the microprocessor is unstable in the first duration period (i.e., when the operation state of the microprocessor is rapidly changed in the first duration period). In addition, the method according to an exemplary embodiment may prevent power consumption and performance degradation of the microprocessor due to unnecessary power level changes by exponentially increasing the length of the first duration period when the operation state of the microprocessor is stable in the first duration period (i.e., when the operation state of the microprocessor is gradually changed in the first duration period). Particularly, the method according to an exemplary embodiment may achieve high reactivity to the operation state of the microprocessor because the length of the duration period is exponentially changed. Further, in the method according to an exemplary embodiment, the length of the duration period may be changed to a predetermined period length, or may be adjusted (i.e., increased or decreased) by a predetermined value based on an external command when the length of the duration period inaccurately reflects the operation state of the microprocessor in the duration period.

The power level (i.e., the operation frequency and/or the operation voltage) of the microprocessor for the second duration period may be predicted based on the period workload rate in the first duration period at an end timing point T(n) of the first duration period (i.e., a timing point at which the length of the first duration period is the same as a sum of lengths of the unit periods in the first duration period). Accordingly, the predicted power level of the microprocessor may be maintained in the second duration period. Similarly, the power level (i.e., the operation frequency and/or the operation voltage) of the microprocessor for the third duration period may be predicted based on the period workload rate of the second duration period at an end timing point T(n+1) of the second duration period (i.e., a timing point at which the length of the second duration period is the same as sum of lengths of the unit periods in the second duration period). As described above, the method of dynamically scaling a power level of a microprocessor according an exemplary embodiment may adaptively change the length of the duration period based on the operation state of the microprocessor in the duration period. In an exemplary embodiment, the power level of the microprocessor may be changed to a predetermined power level, or may be adjusted (i.e., increased or decreased) by a predetermined value based on an external command when the power level of the microprocessor is different from an actual power level that the microprocessor uses.

Figure 3:
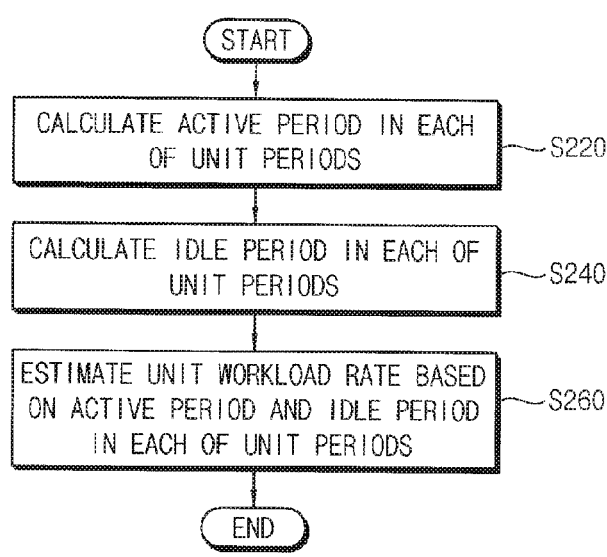
FIG. 3 is a flow chart illustrating an example of a unit workload rate calculated according to an exemplary embodiment.

FIG. 3 is a flow chart illustrating an example of a unit workload rate calculated in a method of dynamically scaling a power level of a microprocessor according an exemplary embodiment. Referring to FIG. 3, the active period may be calculated in each of the unit periods (operation S220). In addition, the idle period may be calculated in each of the unit periods (operation S240). The unit workload rate may be estimated based on the active period and the idle period in each of the unit periods. In an exemplary embodiment, the unit workload rate may be estimated using [Expression 1] below:

$$UWR = \frac{AT}{UT} = \frac{UT - IT}{UT} \qquad \text{[Expression 1]}$$

In Expression 1, UWR denotes the unit workload rate, UT denotes each of the unit periods, AT denotes the active period in each of the unit periods, and IT denotes the idle period in each of the unit periods.

As described above, the active period may be a period in which the main clock signal is applied to the microprocessor, and the idle period may be a period in which the main clock signal is not applied to the microprocessor. For example, the active period may correspond to a period of a traffic mode and/or a standby mode for a mobile communication terminal, and the idle period may correspond to a period of a sleep mode for the mobile communication terminal. Both of the active period and the idle period may be determined by an operating system (OS). Further, a frequency of the main clock signal applied to the microprocessor may correspond to the operation frequency of the microprocessor. According to an exemplary embodiment, [Expression 1] may be modified based on conditions for the microprocessor.

Figure 4:
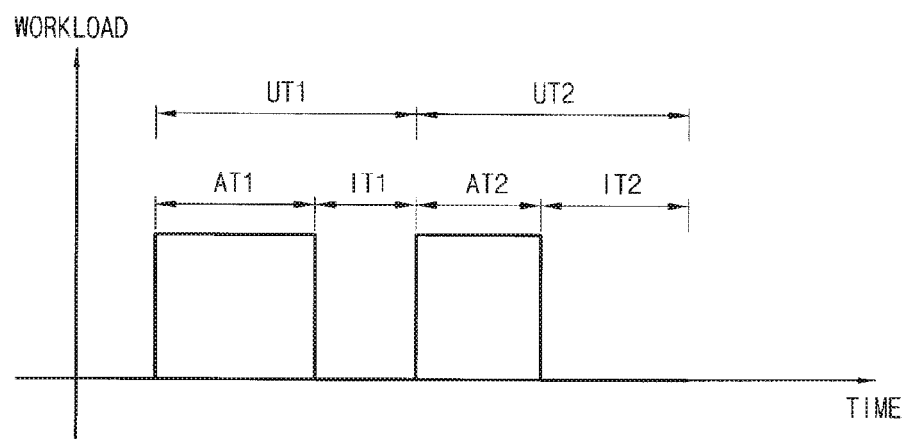
FIG. 4 is a graph illustrating an example of a unit workload rate calculated according to an exemplary embodiment.

FIG. 4 is a graph illustrating an example of a unit workload rate calculated in a method of dynamically scaling a power level of a microprocessor according an exemplary embodiment. Referring to FIG. 4, a first unit workload rate may be estimated based on a first active period AT1 and a first idle period IT1, and a second unit workload rate may be estimated based on a second active period AT2 and a second idle period IT2. For example, the first unit workload rate may be calculated as UWR1=(UT1−IT1)/UT1=AT1/UT1. The second unit workload rate may be calculated as UWR2=(UT2−IT2)/UT2=AT2/UT2. As illustrated in FIG. 4, the length of the first unit period UT1 and the length of the second unit period UT2 are fixed. Further, the length of the first unit period UT1 is the same as the length of the second unit period UT2. After the first unit workload rate and the second unit workload rate are estimated, the variation of the unit workload rate may be calculated by subtracting the first unit workload rate from the second unit workload rate. That is, the variation of the unit workload rate may be calculated as dUWR=(UWR2−UWR1)=(AT2−AT1)/UT. In this manner, the variation of the unit workload rate may continue to be calculated until an end timing point of a duration period. As a result, the length of the duration period may continue to be changed based on the variation of the unit workload rate. Here, the length of the duration period may be changed in response to every variation of the unit workload rate. Alternatively, the length of the duration period may be changed in response to some variations of the unit workload rate according to user settings.

Figure 5:
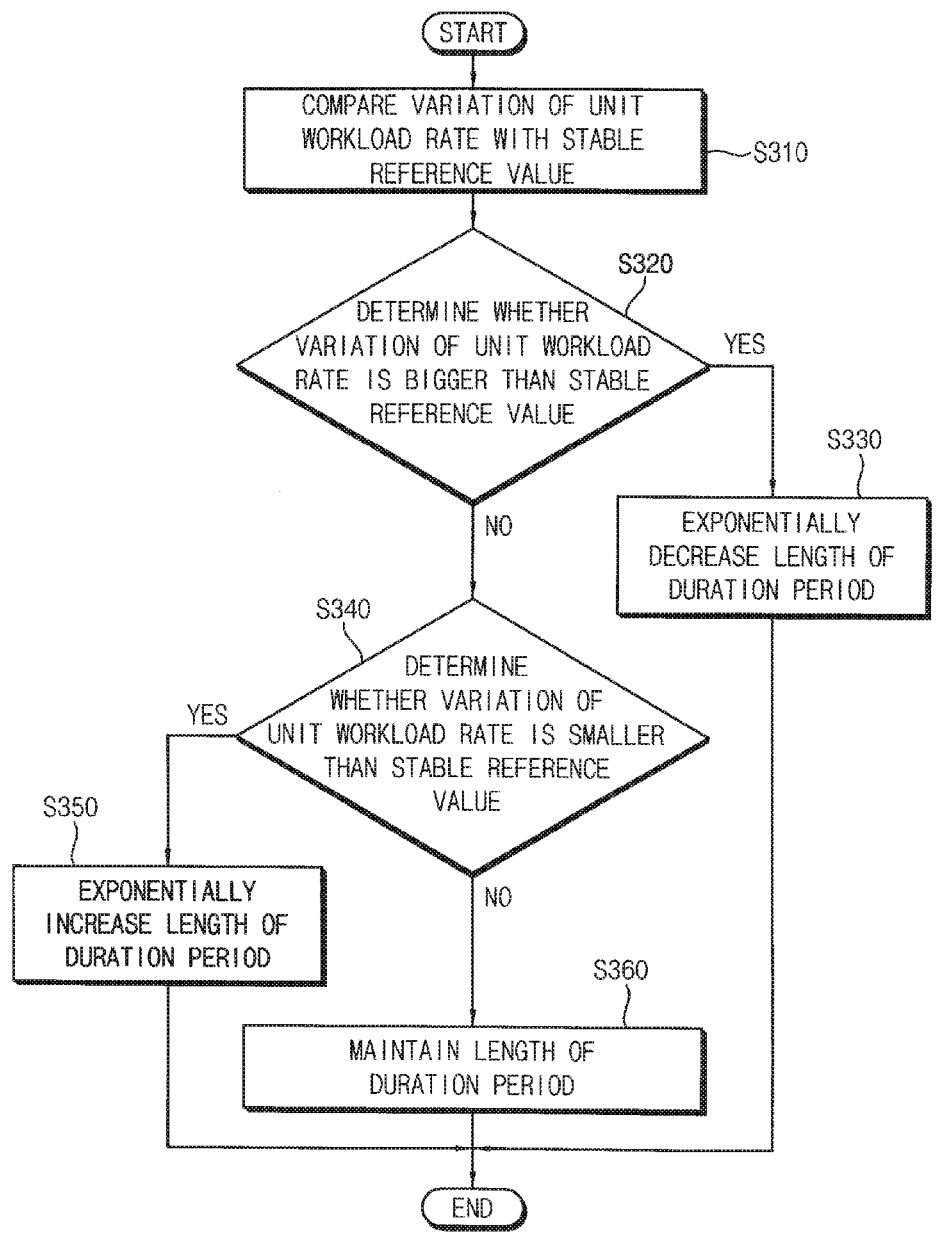
FIG. 5 is a flow chart illustrating an example of a length of a duration period changed according to an exemplary embodiment.

FIG. 5 is a flow chart illustrating an example of a length of a duration period changed in a method of dynamically scaling a power level of a microprocessor according an exemplary embodiment. Referring to FIG. 5, the variation of the unit workload rate may be compared with a stable reference value (operation S310). It may be determined whether the variation of the unit workload rate is greater than the stable reference value (operation S320). If the variation of the unit workload rate is greater than the stable reference value, the length of the duration period may be exponentially decreased (operation S330). It may be determined whether the variation of the unit workload rate is less than the stable reference value (operation S340). If the variation of the unit workload rate is less than the stable reference value, the length of the duration period may be exponentially increased (operation S350). In addition, the length of the duration period may be maintained if the variation of the unit workload rate is the same as the stable reference value (operation S360). For example, the length of the duration period may be changed between a predetermined maximum period length and a predetermined minimum period length. In an exemplary embodiment, the length of the duration period may be changed using [Expression 2] below:

$$SPR = FPR \times 2^{-r(|dUWR|-SV)}$$ [Expression 2]

In Expression 2, FPR denotes a previous length of the duration period, SPR denotes a changed length of the duration period, r denotes an exponential ratio determined by users, dUWR denotes the variation of the unit workload rate, and SV denotes the stable reference value.

As described above, the length of the duration period may be exponentially decreased when the variation of the unit workload rate is relatively big (operation S350). Thus, the length of the duration period may accurately reflect the operation state of the microprocessor. In addition, the length of the duration period may be exponentially increased when the variation of the unit workload rate is relatively small (operation S330). Thus, performance degradation and power consumption of the microprocessor due to unnecessary power level changes may be prevented. As a result, the method of dynamically scaling a power level of a microprocessor according an exemplary embodiment may adaptively change the length of the duration period based on the operation state of the microprocessor. According to an exemplary embodiment, [Expression 2] may be modified based on conditions for the microprocessor.

Figure 6:
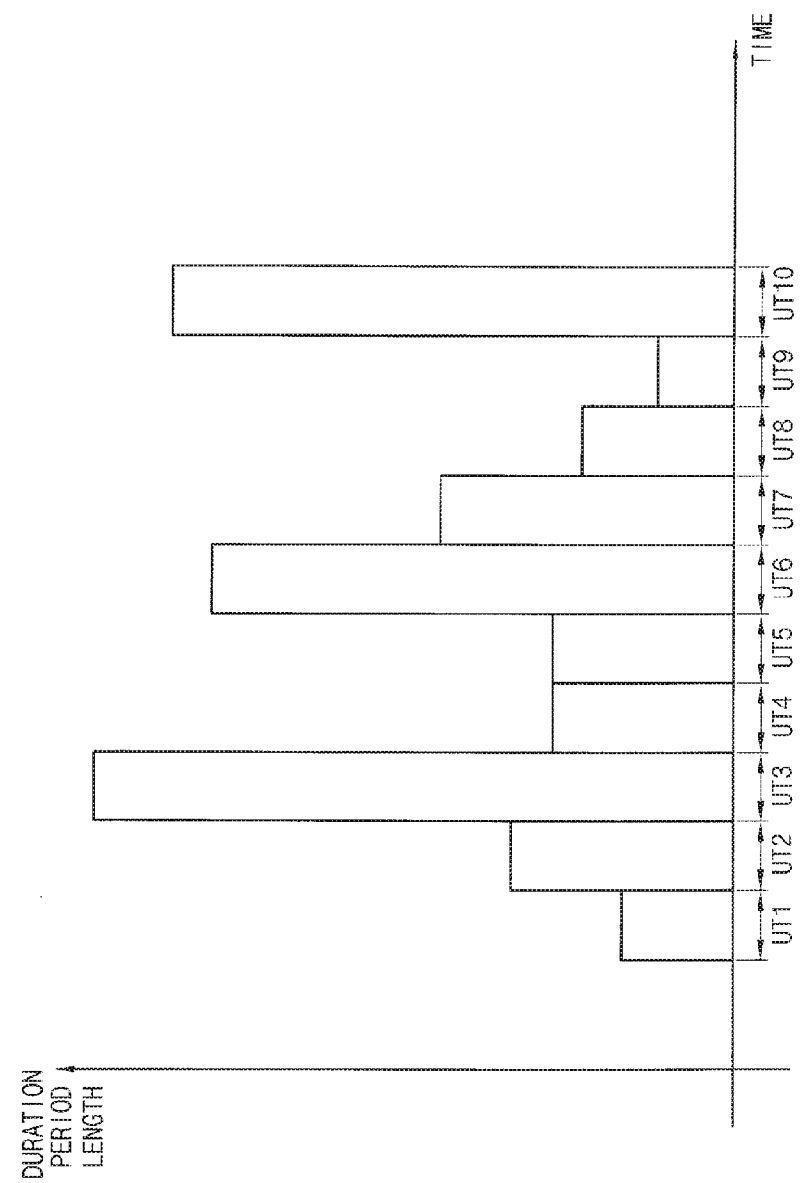
FIG. 6 is a graph illustrating an example of a length of a duration period changed according to an exemplary embodiment.

FIG. 6 is a graph illustrating an example of a length of a duration period changed in a method of dynamically scaling a power level of a microprocessor according an exemplary embodiment. Referring to FIG. 6, the length of the duration period may continue to be exponentially changed. In related art techniques, the length of the duration period is fixed or is linearly changed. Thus, the length of the duration period may not accurately reflect the operation state of the microprocessor. On the other hand, in the method according to an exemplary embodiment, the length of the duration period may accurately reflect the operation state of the microprocessor by calculating the unit workload rate during each of the unit periods UT1 through UTn, and by exponentially changing the length of the duration period based on the variation of the unit workload rate. As described above, the lengths of the unit periods UT1 through UTn are fixed. Further, the lengths of the unit period UT1 have the same value. As illustrated in FIG. 6, the method according to an exemplary embodiment may achieve high reactivity to the operation state of the microprocessor by calculating the unit workload rate during each of the unit periods UT1 through UTn, and by exponentially changing the length of the duration period based on the variation of the unit workload rate. Accordingly, the power level of the microprocessor may be changed based on the period workload rate of the duration period at an end timing point of the duration period (i.e., a timing point at which the length of the duration period is the same as a sum of lengths of the unit periods UT1 through UTn)

Figure 7:
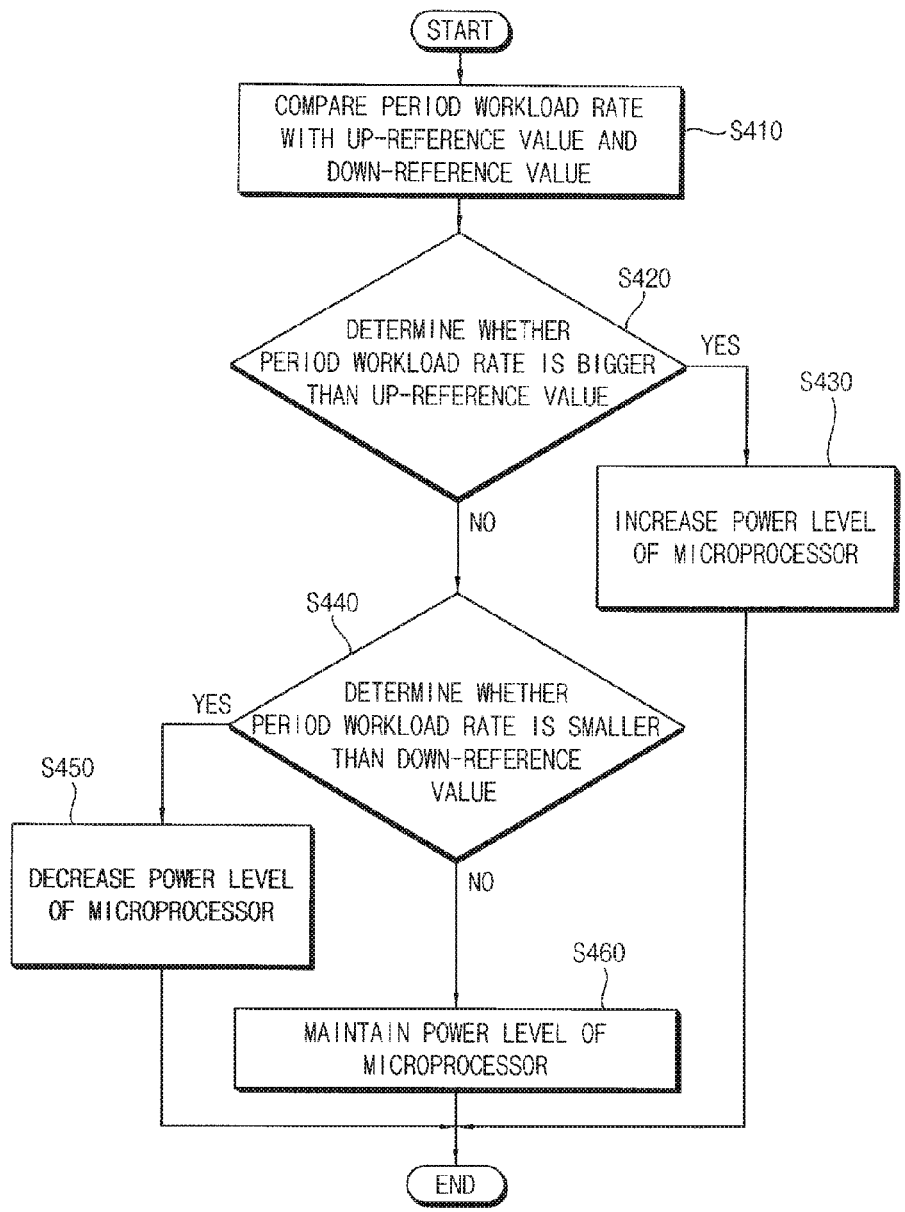
FIG. 7 is a flow chart illustrating an example of a power level of a microprocessor changed according to an exemplary embodiment.

FIG. 7 is a flow chart illustrating an example of a power level of a microprocessor changed in a method of dynamically scaling a power level of a microprocessor according an exemplary embodiment. Referring to FIG. 7, the period workload rate may be compared with an up-reference value and a down-reference value (operation S410). Here, the period workload rate may be a sum of the unit workload rate calculated during each of the unit periods in the duration period. It may be determined whether the period workload rate is greater than the up-reference value (operation S420). If the period workload rate is greater than the up-reference value, the power level of the microprocessor may be increased (operation S430). It may be determined whether the period workload rate is less than the down-reference value (operation S440). If the period workload rate is less than the down-reference value, the power level of the microprocessor may be decreased (operation S450). In addition, the power level of the microprocessor may be maintained if the period workload rate is between the up-reference value and the down-reference value (operation S460). For example, the power level of the microprocessor may be changed between a predetermined maximum power level and a predetermined minimum power level. In an exemplary embodiment, the power level of the microprocessor may be changed by sequentially selecting one of discrete power levels. For example, the power level of the microprocessor may be changed by sequentially selecting one of discrete operation frequencies (e.g., 500 MHz, 250 MHz, 125 MHz). According to an exemplary embodiment, the discrete power level may be variously determined based on conditions for the microprocessor.

The period workload rate may be calculated by accumulating the unit workload rate calculated during each of the unit periods in the duration period. In an exemplary embodiment, the period workload rate may be calculated by accumulating the unit workload rate in the duration period while applying weight to the unit workload rate. For example, the biggest weight may be applied to the latest unit workload rate, and the smallest weight may be applied to the earliest unit workload rate. In one example embodiment, the period workload rate may be calculated using [Expression 3] below:

$$PWR = \frac{\sum_{x=1}^{n}(x^C \times UWRx)}{\sum_{x=1}^{n}(x^C)}, C \geq 0 \quad \text{[Expression 3]}$$

In Expression 3, PWR denotes the period workload rate, UWRx denotes a (n)th unit workload rate, C denotes weight, and the duration period includes n unit periods.

Applying the weight to the unit workload rate may be selectively performed according to a system performance because applying the weight to the unit workload rate may impose a heavy burden on specific systems. Thus, the weight may be variously set based on conditions for the microprocessor. For example, the weight may be set as 0 in a mobile system such as a mobile communication terminal. According to an exemplary embodiment, [Expression 3] may be modified based on conditions for the microprocessor.

Figure 8:
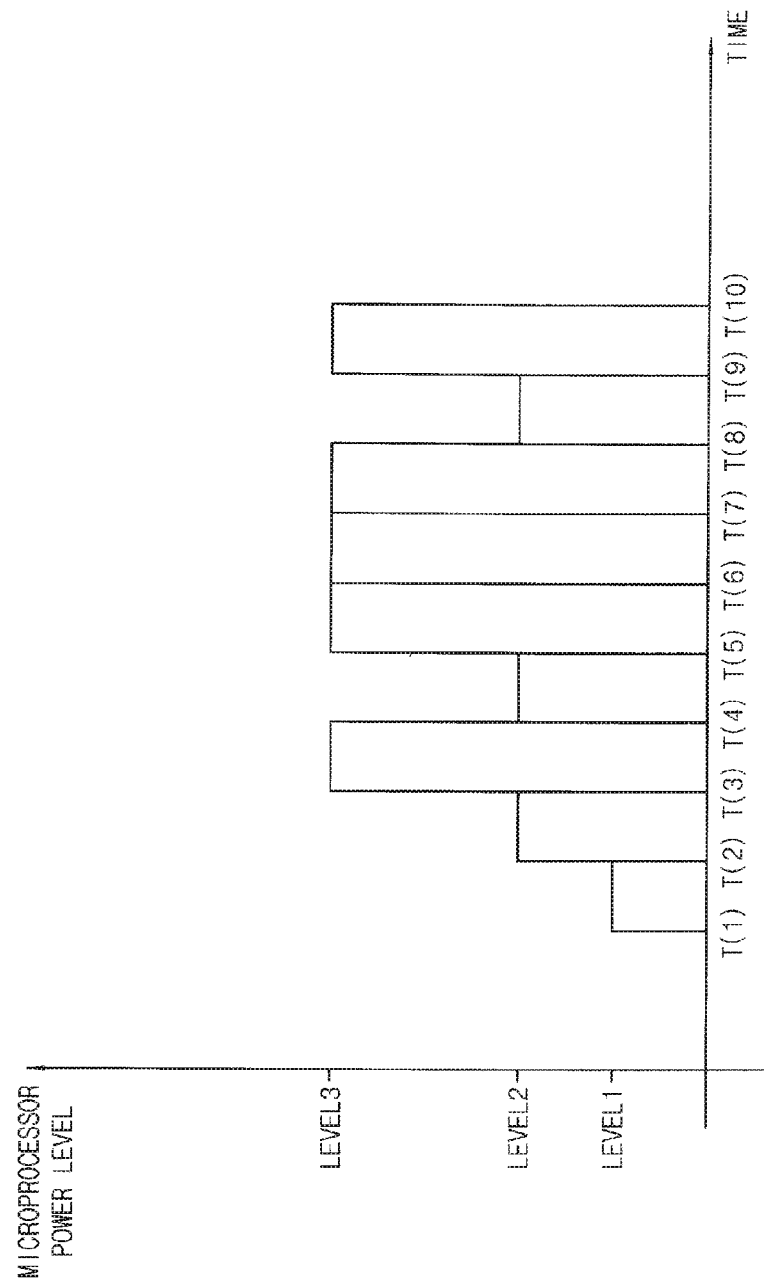
FIG. 8 is a graph illustrating an example of a power level of a microprocessor changed according to an exemplary embodiment.

FIG. 8 is a graph illustrating an example of a power level of a microprocessor changed in a method of dynamically scaling a power level of a microprocessor according an exemplary embodiment. Referring to FIG. 8, the power level of the microprocessor may be changed based on the period workload rate. The power level of the microprocessor may be changed by sequentially selecting one of discrete power levels. Here, one of the discrete power levels may be two times greater than another of the discrete power levels. For example, a third power level LEVEL3 may be two times greater than a second power level LEVEL2, and the second power level LEVEL2 may be two times greater than a first power level LEVEL1. For convenience of description, an (n)th duration period is defined to be from an (n)th timing point T(n) to an (n+1)th timing point T(n+1). For example, the power level of the microprocessor may be increased from the first power level LEVEL1 to the second power level LEVEL2 when the period workload rate of the first duration period is greater than the up-reference value. In addition, the power level of the microprocessor may be decreased from the third power level LEVEL3 to the second power level LEVEL2 when the period workload rate of the third duration period is less than the down-reference value. Further, the power level of the microprocessor may be maintained as the third power level LEVEL3 when the period workload rate of the fifth duration period is between the up-reference value and the down-reference value. As described above, the power level of the microprocessor for an (n+1)th duration period may be determined (i.e., predicted) by comparing the period workload rate of the (n)th duration period with the up-reference value and the down-reference value.

Figure 9:
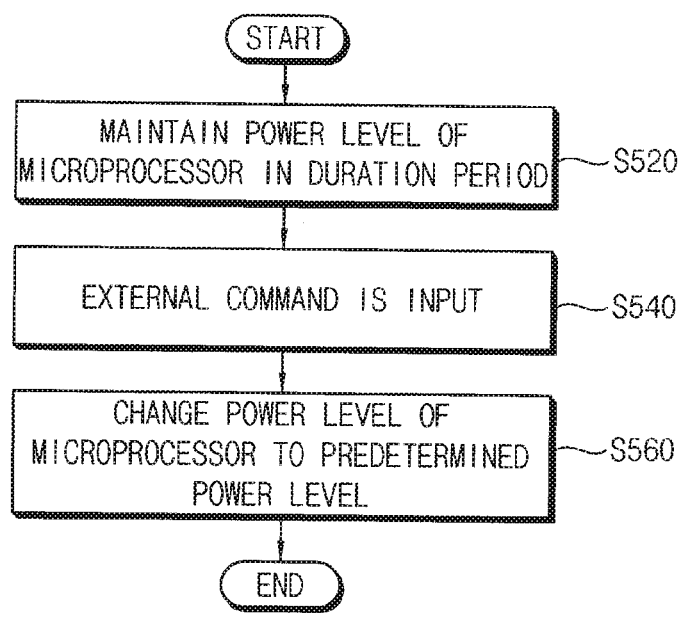
FIG. 9 is a flow chart illustrating an example of a power level of a microprocessor changed to a predetermined power level based on an external command according to an exemplary embodiment.

FIG. 9 is a flow chart illustrating an example of a power level of a microprocessor changed to a predetermined power level based on an external command in a method of dynamically scaling a power level of a microprocessor according an exemplary embodiment. Referring to FIG. 9, if the external command is input (operation S540) while the power level of the microprocessor is maintained in the duration period (operation S520), the power level of the microprocessor may be changed to a predetermined power level (operation S560). As described above, the power level of the microprocessor for the (n+1)th duration period is predicted based on the period workload rate of the (n)th duration period. Thus, the predicted power level of the microprocessor may be different from the actual power level that the microprocessor uses. In this case, the power level of the microprocessor may be changed to the actual power level that the microprocessor uses by changing the power level of the microprocessor to the predetermined power level based on the external command. In an exemplary embodiment, the predetermined power level may be selected from a plurality of discrete power levels based on the external command. In an exemplary embodiment, the predetermined power level may be a maximum power level or a minimum power level of the microprocessor. Further, the external command may include information as to how long the changed power level of the microprocessor will last.

Figure 10:
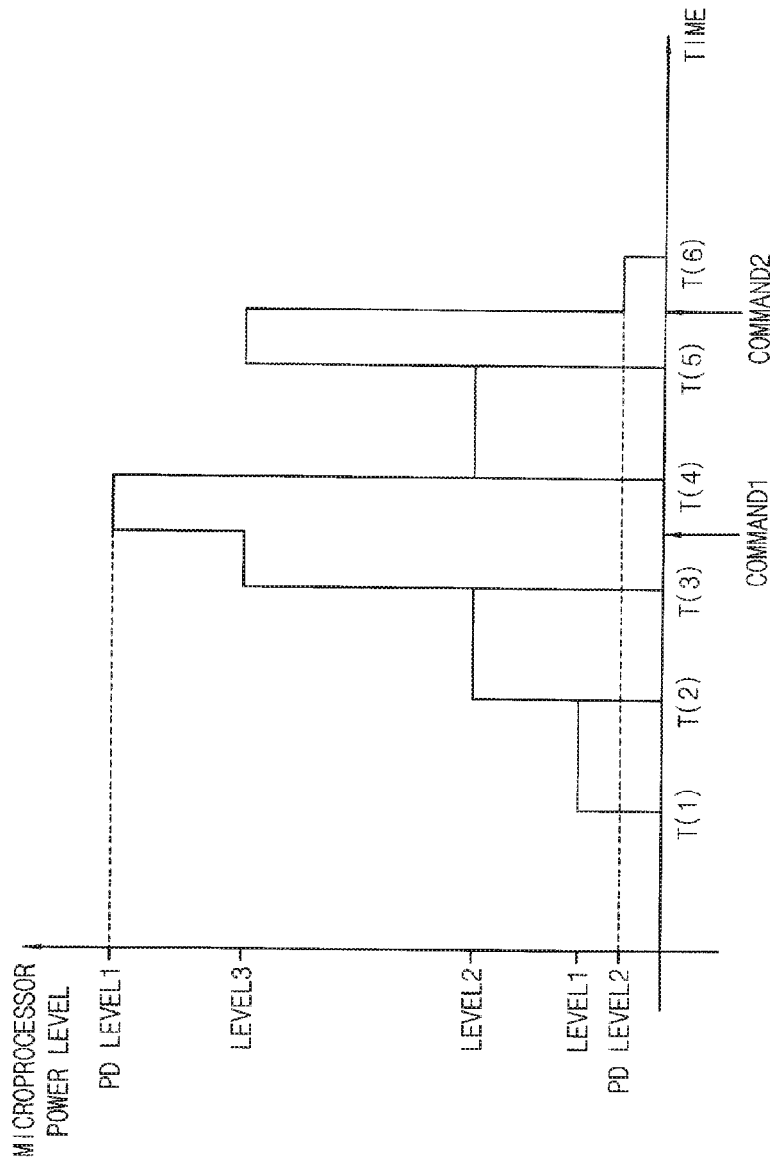
FIG. 10 is a graph illustrating an example of a power level of a microprocessor changed to a predetermined power level based on an external command according to an exemplary embodiment.

FIG. 10 is a graph illustrating an example of a power level of a microprocessor changed to a predetermined power level based on an external command in a method of dynamically scaling a power level of a microprocessor according an exemplary embodiment. Referring to FIG. 10, if a first external command COMMAND1 or a second external command COMMAND2 is input while the power level of the microprocessor is maintained in the duration period, the power level of the microprocessor may be changed to a first predetermined power level PD LEVEL1 or a second predetermined power level PD LEVEL2. For convenience of description, an (n)th duration period is defined to be from a (n)th timing point T(n) to an (n+1)th timing point T(n+1). For example, the power level of the microprocessor for a third duration period may be determined to be a third power level LEVEL3 based on the period workload rate of the second duration period. Thus, the power level of the microprocessor may be maintained as the third power level LEVEL3 in the third duration period. If the power level of the microprocessor for the third duration period is determined to be relatively small compared to the actual power level that the microprocessor uses in the third duration period, the first external command COMMAND1 may be input. As a result, the power level of the microprocessor for the third duration period may be changed to the first predetermined power level PD LEVEL1 based on the first external command COMMAND1. Similarly, the power level of the microprocessor for a fifth duration period may be determined to be the third power level LEVEL3 based on the period workload rate of the fourth duration period. Thus, the power level of the microprocessor may be maintained as the third power level LEVEL3 in the fifth duration period. If the power level of the microprocessor for the fifth duration period is determined to be relatively big compared to the actual power level that the microprocessor uses in the fifth duration period, the second external command COM- MAND2 may be input. As a result, the power level of the microprocessor for the fifth duration period may be changed to the second predetermined power level PD LEVEL2 based on the second external command COMMAND2.

Figure 11:
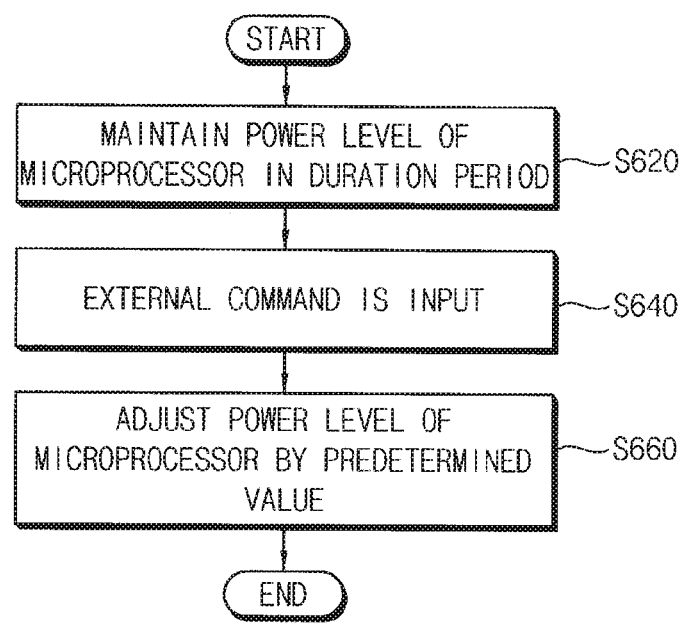
FIG. 11 is a flow chart illustrating an example of a power level of a microprocessor adjusted by a predetermined value based on an external command according to an exemplary embodiment.

FIG. 11 is a flow chart illustrating an example of a power level of a microprocessor adjusted by a predetermined value based on an external command in a method of dynamically scaling a power level of a microprocessor according an exemplary embodiment. Referring to FIG. 11, if the external command is input (operation S640) while the power level of the microprocessor is maintained in the duration period (operation S620), the power level of the microprocessor may be adjusted (i.e., increased or decreased) by a predetermined value (operation S660). As described above, the power level of the microprocessor for the (n+1)th duration period is predicted based on the period workload rate of the (n)th duration period. Thus, the predicted power level of the microprocessor may be different from the actual power level that the microprocessor uses. In this case, the power level of the microprocessor may be adjusted (i.e., increased or decreased) by the predetermined value based on the external command to be the actual power level that the microprocessor uses. Further, the external command may include information as to how long the adjusted power level of the microprocessor will last.

Figure 12:
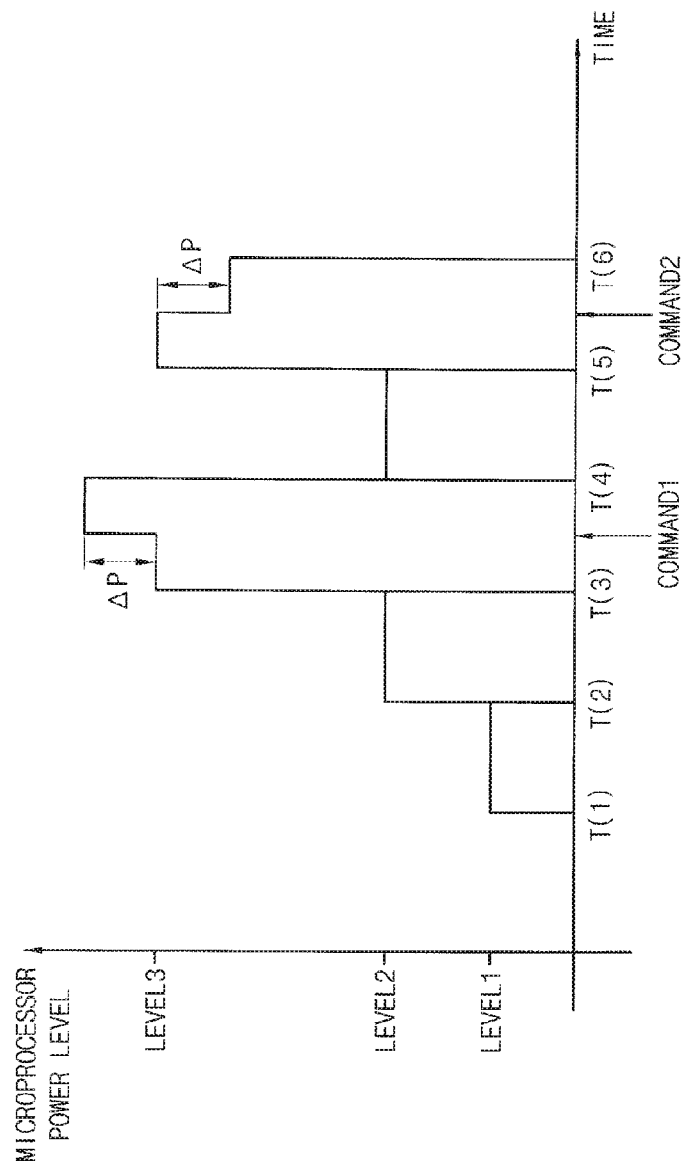
FIG. 12 is a graph illustrating an example of a power level of a microprocessor adjusted by a predetermined value based on an external command according to an exemplary embodiment.

FIG. 12 is a graph illustrating an example of a power level of a microprocessor adjusted by a predetermined value based on an external command in a method of dynamically scaling a power level of a microprocessor according an exemplary embodiment. Referring to FIG. 12, if a first external command COMMAND1 or a second external command COMMAND2 is input while the power level of the microprocessor is maintained in the duration period, the power level of the microprocessor may be adjusted by a predetermined value ΔP. For convenience of description, an (n)th duration period is defined to be from an (n)th timing point T(n) to an (n+1)th timing point T(n+1). For example, the power level of the microprocessor for a third duration period may be determined to be a third power level LEVEL3 based on the period workload rate of the second duration period. Thus, the power level of the microprocessor may be maintained as the third power level LEVEL3 in the third duration period. If the power level of the microprocessor for the third duration period is determined to be relatively small compared to the actual power level that the microprocessor uses in the third duration period, the first external command COMMAND1 may be input. As a result, the power level of the microprocessor for the third duration period may be increased by the predetermined value ΔP based on the first external command COMMAND1. Similarly, the power level of the microprocessor for a fifth duration period may be determined to be the third power level LEVEL3 based on the period workload rate of the fourth duration period. Thus, the power level of the microprocessor may be maintained as the third power level LEVEL3 in the fifth duration period. If the power level of the microprocessor for the fifth duration period is determined to be relatively big compared to the actual power level that the microprocessor uses in the fifth duration period, the second external command COMMAND2 may be input. As a result, the power level of the microprocessor for the fifth duration period may be decreased by the predetermined value ΔP based on the second external command COMMAND2.

Figure 13:
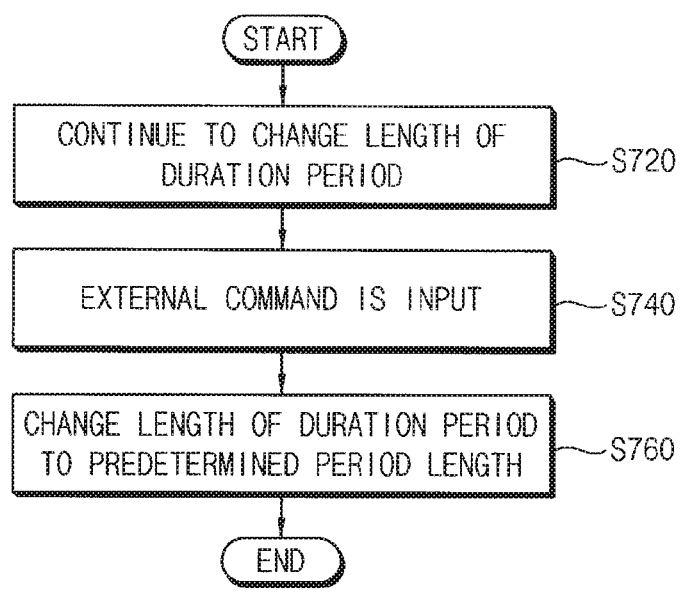
FIG. 13 is a flow chart illustrating an example of a length of a duration period changed to a predetermined period length based on an external command according to an exemplary embodiment.

FIG. 13 is a flow chart illustrating an example of a length of a duration period changed to a predetermined period length based on an external command in a method of dynamically scaling a power level of a microprocessor according an exemplary embodiment. Referring to FIG. 13, if the external command is input (operation S740) while the length of the duration period continues to be changed in the duration period (operation S720), the length of the duration period may be changed to a predetermined period length (operation S760). As described above, the length of the duration period is exponentially decreased when the operation state of the microprocessor is unstable (i.e., when the operation state of the microprocessor is rapidly changed in the duration period), and the length of the duration period is exponentially increased when the operation state of the microprocessor is stable (i.e., when the operation state of the microprocessor is gradually changed in the duration period). That is, the length of the duration period continues to be exponentially changed based on the operation state of the microprocessor in the duration period. However, according to a specific condition for the microprocessor to execute an application, the length of the duration period may be decreased although the operation state of the microprocessor is stable, and the length of the duration period may be increased although the operation state of the microprocessor is unstable. In this case, the length of the duration period may be changed to the predetermined period length based on the external command. In an exemplary embodiment, the predetermined period length may be a predetermined maximum period length or a predetermined minimum period length. Further, the external command may include information as to how long the changed length of the duration period will last.

Figure 14:
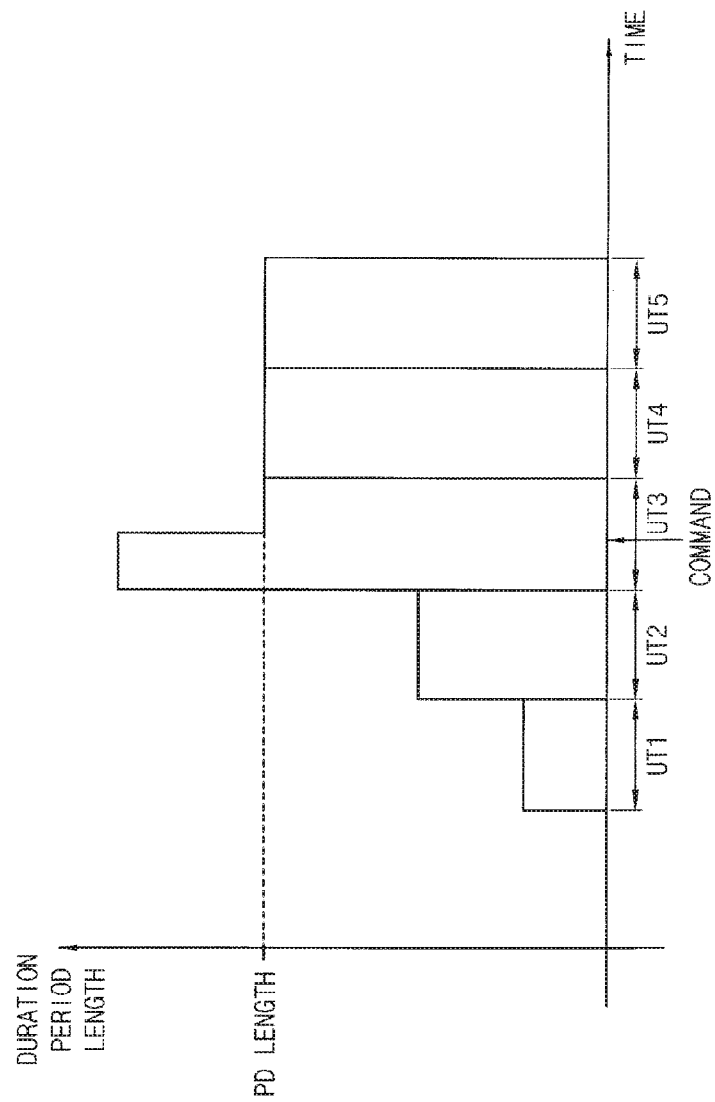
FIG. 14 is a graph illustrating an example of a length of a duration period changed to a predetermined period length based on an external command according to an exemplary embodiment.

FIG. 14 is a graph illustrating an example of a length of a duration period changed to a predetermined period length based on an external command in a method of dynamically scaling a power level of a microprocessor according an exemplary embodiment. Referring to FIG. 14, if the external command COMMAND is input while the length of the duration period continues to be changed based on the variation of the unit workload rate in the duration period, the length of the duration period may be changed to the predetermined period length PD LENGTH. For example, if the external command COMMAND is input during a third unit period UT3, the length of the duration period may be changed to the predetermined period length PD LENGTH. Accordingly, the power level of the microprocessor may be changed based on the period workload rate of the duration period at an end timing point of the duration period. (i.e., a timing point at which the length of the duration period is the same as a sum of lengths of the unit periods UT1 through UTn in the duration period). In an exemplary embodiment, the predetermined period length PD LENGTH may be the predetermined maximum period length or the predetermined minimum period length.

Figure 15:
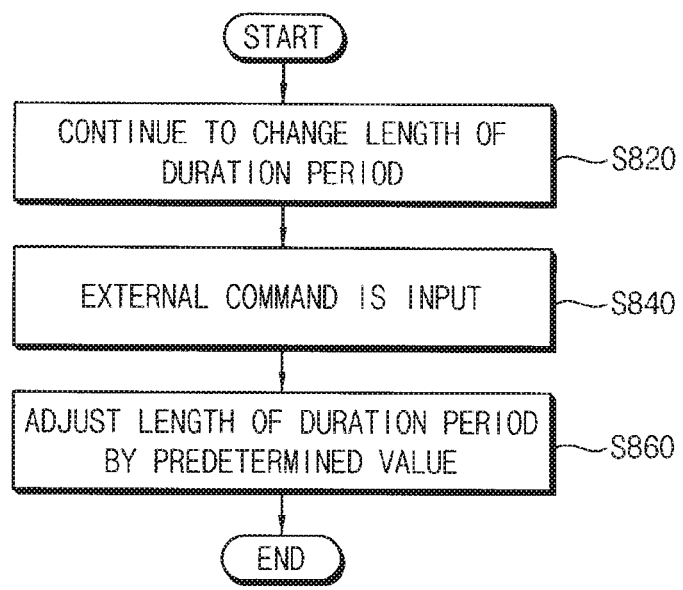
FIG. 15 is a flow chart illustrating an example of a length of a duration period adjusted by a predetermined value based on an external command according to an exemplary embodiment.

FIG. 15 is a flow chart illustrating an example of a length of a duration period adjusted by a predetermined value based on an external command in a method of dynamically scaling a power level of a microprocessor according an exemplary embodiment. Referring to FIG. 15, if the external command is input (operation S840) while the length of the duration period continues to be changed in the duration period (operation S820), the length of the duration period may be adjusted (i.e., increased or decreased) by a predetermined value (operation S860). As described above, the length of the duration period is exponentially decreased when the operation state of the microprocessor is unstable (i.e., when the operation state of the microprocessor is rapidly changed in the duration period), and the length of the duration period is exponentially increased when the operation state of the microprocessor is stable (i.e., when the operation state of the microprocessor is gradually changed in the duration period). That is, the length of the duration period continues to be exponentially adjusted based on the operation state of the microprocessor in the duration period. However, according to a specific condition for the microprocessor to execute an application, the length of the duration period may be decreased although the operation state of the microprocessor is stable, and the length of the duration period may be increased although the operation state of the microprocessor is unstable. In this case, the length of the duration period may be adjusted (i.e., increased or decreased) by the predetermined value based on the external command. Further, the external command may include information as to how long the adjusted length of the duration period will last.

Figure 16:
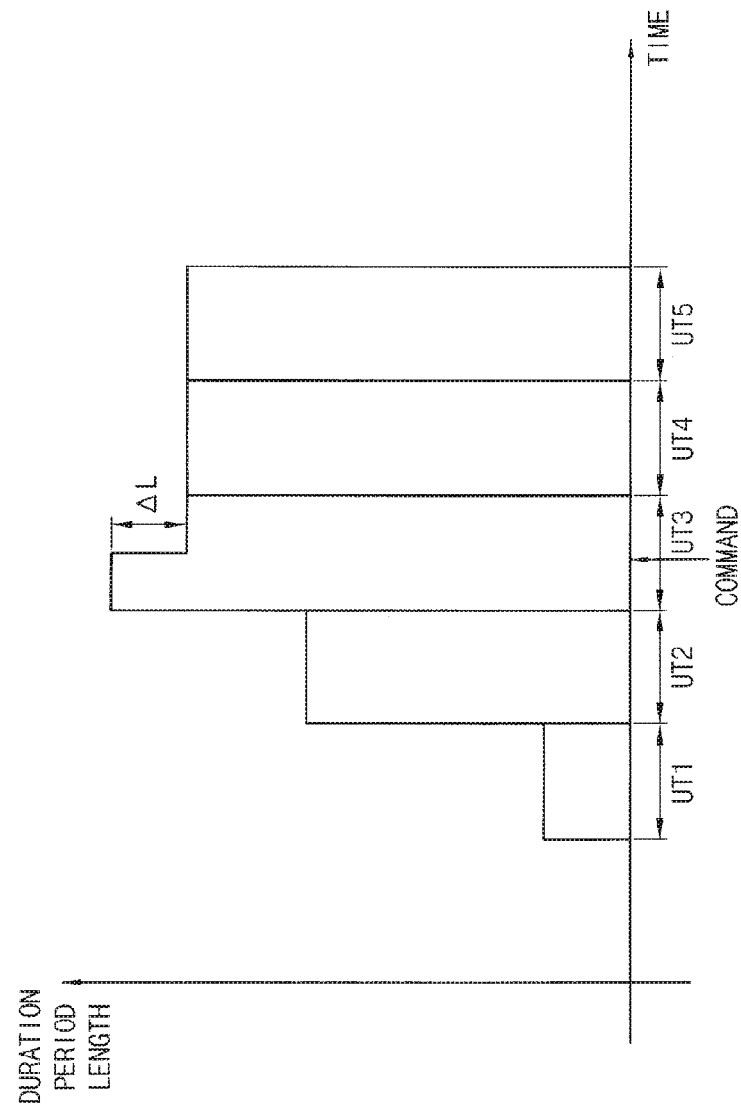
FIG. 16 is a graph illustrating an example of a length of a duration period adjusted by a predetermined value based on an external command according to an exemplary embodiment.

FIG. 16 is a graph illustrating an example of a length of a duration period adjusted by a predetermined value based on an external command in a method of dynamically scaling a power level of a microprocessor according an exemplary embodiment. Referring to FIG. 16, if the external command COMMAND is input while the length of the duration period continues to be changed based on the variation of the unit workload rate in the duration period, the length of the duration period may be adjusted (i.e., increased or decreased) by the predetermined value ΔL. For example, if the external command COMMAND is input during a third unit period UT3, the length of the duration period may be decreased by the predetermined value ΔL. Accordingly, the power level of the microprocessor may be changed based on the period workload rate of the duration period at an end timing point of the duration period (i.e., a timing point at which the length of the duration period is the same as a sum of lengths of the unit periods UT1 through UTn in the duration period).

Figure 17:
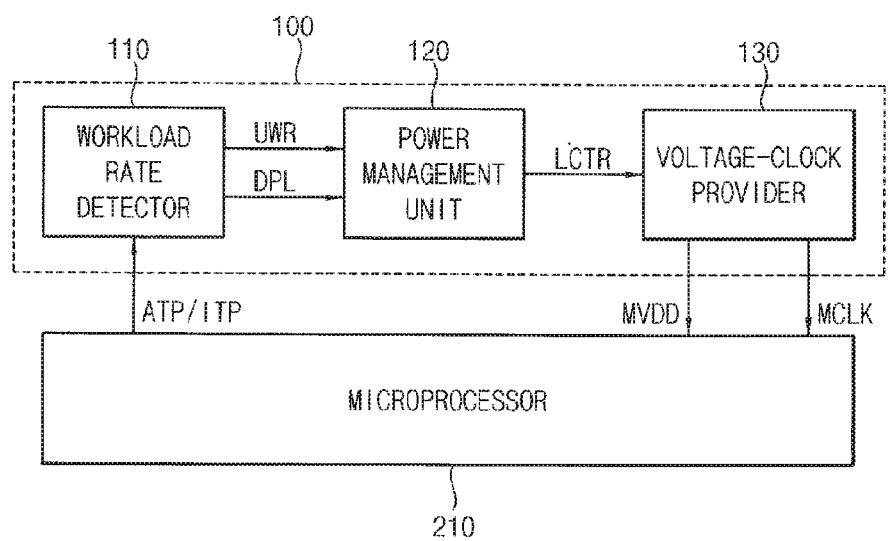
FIG. 17 is a block diagram illustrating a power management device for dynamically scaling a power level of a microprocessor according to an exemplary embodiment.

FIG. 17 is a block diagram illustrating a power management device for dynamically scaling a power level of a microprocessor according to an exemplary embodiment. Referring to FIG. 17, the power management device 100 may include a workload rate detector 110, a power management unit 120, and a voltage-clock provider 130. Moreover, the power management device 100 may manage the power level of the microprocessor 210. The power management device 100 may be an electric device such as a mobile communication terminal, or may be an additional device in the electric device. The power management device 100 may further include a system timer for generating a periodic signal such as system ticks, and a controller for controlling specific signals such as an external command and the periodic signal.

The microprocessor 210 may be a central processing unit (CPU), a digital signal processor (DSP), a microcontroller, etc. The microprocessor 210 may perform specific tasks for the electric device. The microprocessor 210 may receive a main clock signal MCLK and a main power voltage MVDD from the voltage-clock provider 130, and may operate in synchronization with the main clock signal MCLK. In an exemplary embodiment, the microprocessor 210 may receive the main clock signal MCLK during an active period ATP in each of unit periods, and may not receive the main clock signal MCLK during an idle period ITP in each of the unit periods. As described above, the active period ATP and the idle period ITP may be determined by an operating system (OS). For example, as the OS determines the idle period ITP, the active period ATP may be determined by subtracting the idle period ITP from each of the unit periods. A frequency of the main clock signal MCLK may correspond to an operation frequency of the microprocessor 210, and a magnitude of the main power voltage MVDD may correspond to a magnitude of an operation voltage of the microprocessor 210.

The workload rate detector 110 may monitor an operation state of the microprocessor 210 to output a unit workload rate UWR and a length DPL of a duration period to the power management unit 120. In detail, the workload rate detector 110 may receive information about the active period ATP and the idle period ITP from the microprocessor 210 in each of the unit periods, and may sequentially calculate the unit workload rate UWR based on the active period ATP and the idle period ITP in each of the unit periods. In addition, the workload rate detector 110 may continue to exponentially change the length DPL of the duration period based on variation dUWR of the unit workload rate UWR. In an exemplary embodiment, the workload rate detector 110 may change the length DPL of the duration period to a predetermined period length based on an external command, or may adjust the length DPL of the duration period by a predetermined value based on an external command. Since the length changes of the duration period are described above, the description of the length changes of the duration period are omitted herein for convenience of description. The workload rate detector 110 may output the length DPL of the duration period to the power management unit 120 at an end timing point of the duration period (i.e., a timing point at which the length DPL of the duration period is the same as a sum of lengths of the unit periods in the duration period).

The power management unit 120 may calculate the period workload rate PWR based on the unit workload rate UWR and the length DPL of the duration period, and may output a level control signal LCTR to the voltage-clock provider 130. The level control signal is a signal for changing (i.e., increasing or decreasing) the power level of the microprocessor 210 based on the period workload PWR. The power management unit 120 may be a physical component implemented by hardware, or may be a logical component implemented by software. For example, the power management unit 120 may be a part of the microprocessor 210, or may be a power management program executed by the microprocessor 210.

In an exemplary embodiment, the power management unit 120 may calculate the period workload rate PWR by accumulating the unit workload rate UWR while applying weight to the unit workload rate UWR, and may output the level control signal LCTR by comparing the period workload rate PWR with an up-reference value and a down-reference value. As described above, the level control signal LCTR is a signal for changing (i.e., increasing or decreasing) the power level of the microprocessor 210. As described above, the power management unit 120 may change the power level of the microprocessor 210 to the predetermined power level based on an external command, or may adjust the power level of the microprocessor 210 by the predetermined value based on an external command. Since the power level changes of the microprocessor 210 are described above, a description of the power level changes of the microprocessor 210 will be omitted herein for convenience of description. The power management unit 120 may output the level control signal LCTR to the voltage-clock provider 130.

The voltage-clock provider 130 may adjust the frequency of the main clock signal MCLK and/or the magnitude of the main power voltage MVDD based on the level control signal LCTR, and may output the main clock signal MCLK and/or the main power voltage MVDD to the microprocessor 210. As described above, the frequency of the main clock signal MCLK may correspond to the operation frequency of the microprocessor 210, and the magnitude of the main power voltage MVDD may correspond to the magnitude of the operation voltage of the microprocessor 210. In an exemplary embodiment, the frequency of the main clock signal MCLK and the magnitude of the main power voltage MVDD may be controlled together. For example, as the frequency of the main clock signal MCLK is increased, the magnitude of the main power voltage MVDD may also be increased. Similarly, as the frequency of the main clock signal MCLK is decreased, the magnitude of the main power voltage MVDD may also be decreased. The power management device 100 may accurately predict a power level of the microprocessor 210 for a next duration period by exponentially decreasing a length of a current duration period when the operation state of the microprocessor 210 is unstable in the current duration period. Furthermore, the power management device 100 may prevent performance degradation and power consumption of the microprocessor 210 due to unnecessary power level changes by exponentially increasing the length of the current duration period when the operation state of the microprocessor 210 is stable in the current duration period.

Figure 18:
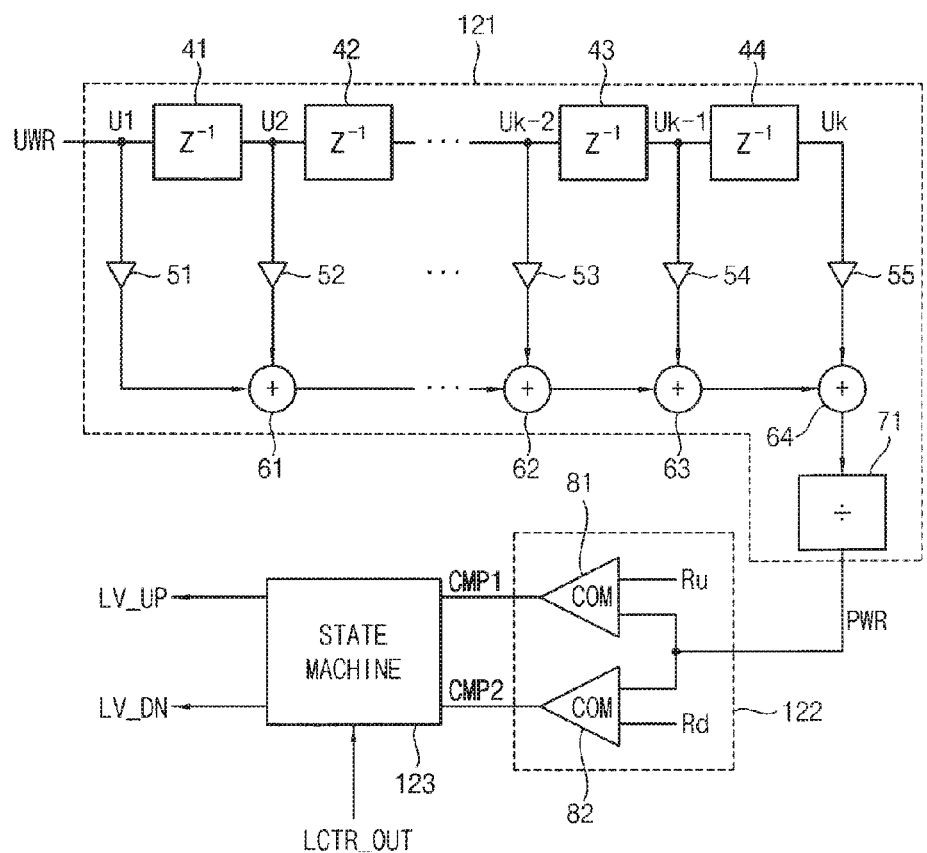
FIG. 18 is a block diagram illustrating a power management unit in a power management device according to an exemplary embodiment.

FIG. 18 is a block diagram illustrating a power management unit 120 in a power management device according to an exemplary embodiment. Referring to FIG. 18, the power management unit 120 may include a calculation unit 121, a comparison unit 122, and a state machine 123. The power management unit 120 may further include a selection unit (not shown) for determining the number of activated buffers among a plurality of buffers 41, 42, 43, and 44, the number of activated amplifiers among a plurality of amplifiers 51, 52, 53, 54, and 55, and the number of activated adders among a plurality of adders 61, 62, 63, and 64. By the selection unit, the power management unit 120 may accumulate the unit workload rate UWR, the number of which is determined based on the length DPL of the duration period.

The calculation unit 121 may receive the unit workload rate UWR that the workload rate detector 110 sequentially outputs in the duration period, and may accumulate the unit workload rate UWR in the duration period to calculate the period workload rate PWR. Here, the length DPL of the duration period is not fixed. That is, the length DPL of the duration period may continue to be exponentially changed based on variation dUWR of the unit workload rate UWR. Thus, the number of the unit workload rate UWR accumulated by the calculation unit 121 may differ according to the length DPL of the duration period. For example, the period workload rate PWR of a first duration period may be calculated by accumulating four unit workload rates UWR, and the period workload rate PWR of a second duration period may be calculated by accumulating eight unit workload rates UWR. In an exemplary embodiment, the period workload rate PWR may be calculated by accumulating the unit workload rate UWR while applying weight to the unit workload rate UWR.

The calculation unit 121 may include the buffers 41, 42, 43, and 44, the amplifiers 51, 52, 53, 54, and 55, the adders 61, 62, 63, and 64, and a divider 71. The buffers 41, 42, 43, and 44 may be storage media. For example, the buffers 41, 42, 43, and 44 may be registers, or specific spaces of a memory matched to specific addresses. Furthermore, the buffers 41, 42, 43, and 44 may be delayers that are connected in series. Each of buffers 41, 42, 43, and 44 may store the unit workload rate UWR output from a previous stage, and may output the unit workload rate UWR to a next stage after a predetermined delay time. As illustrated in FIG. 18, the unit workload rate UWR input from the workload rate detector 110 may be changed from a first unit workload rate U1 to a (k)th unit workload rate Uk by the buffers 41, 42, 43, and 44 as time passes. The buffers 41, 42, 43, and 44 may be implemented by latches that perform an operation of shift registers.

The amplifiers 51, 52, 53, 54, and 55 may amplify the unit workload rates U1 through Uk to output the amplified unit workload rates U1 through Uk to the adders 61 through 64. Here, gains of the amplifiers 51, 52, 53, 54, and 55 may be equally set. Alternatively, the gains of the amplifiers 51, 52, 53, 54, and 55 may be differently set. Generally, the later unit workload rate UWR more accurately reflects a current workload rate of the microprocessor 210. Thus, to apply a bigger weight to the later unit workload rate, the gain of the first amplifier 51 may be biggest, and the gain of the final amplifier 55 may be smallest. That is, as shown in [Expression 3] above, the biggest weight may be applied to the latest unit workload rate Uk, and the smallest weight may be applied to the earliest unit workload rate U1. The adders 61, 62, 63, and 64 may output a sum of the output of the previous stage and the output of the next stage. The divider 71 may generate the period workload rate PWR by dividing the output of the final adder 64 by a sum of the gains of the amplifiers 51, 52, 53, 54, and 55.

The comparison unit 122 may compare the period workload rate PWR with an up-reference value Ru and a down-reference value Rd to generate a comparison signal CMP. The comparison signal CMP may indicate whether to increase the power level of the microprocessor 210 or to decrease the power level of the microprocessor 210. The comparison unit 122 may include a first comparison unit 81 and a second comparison unit 82. The first comparison unit 81 may compare the period workload rate PWR with the up-reference value Ru. Accordingly, the first comparison unit 81 may generate a first comparison signal CMP1 that is activated when the period workload rate PWR is greater than the up-reference value Ru. The second comparison unit 82 may compare the period workload rate PWR with the down-reference value Rd. Accordingly, the second comparison unit 82 may generate a second comparison signal CMP2 that is activated when the period workload rate PWR is less than the down-reference value Rd.

The first comparison signal CMP1 and the second comparison signal CMP2 may be stored in the state machine 123, and the state machine 123 may provide the level control signal LCTR to the voltage-clock provider 130 in response to an output control signal LCTR_OUT. For example, the level control signal LCTR may include a level up signal LV_UP and a level down signal LV_DN. The activation of the level up signal LV_UP may indicate that the power level of the microprocessor 210 should be increased, and the activation of the level down signal LV_DN may indicate that the power level of the microprocessor 210 should be decreased. The level up signal LV_UP and the level down signal LV_DN may be activated in a shape of pulses. If the power management unit 120 is implemented by software, the state machine 123 may be a register inside or outside the microprocessor 210. The state machine 123 may be omitted in another exemplary embodiment. In this case, the first comparison signal CMP1 and the second comparison signal CMP2 may be directly provided to the voltage-clock provider 130 as the level control signal LCTR. It is understood, however, that the structure of the power management unit 120 is not limited thereto.

Figure 19:
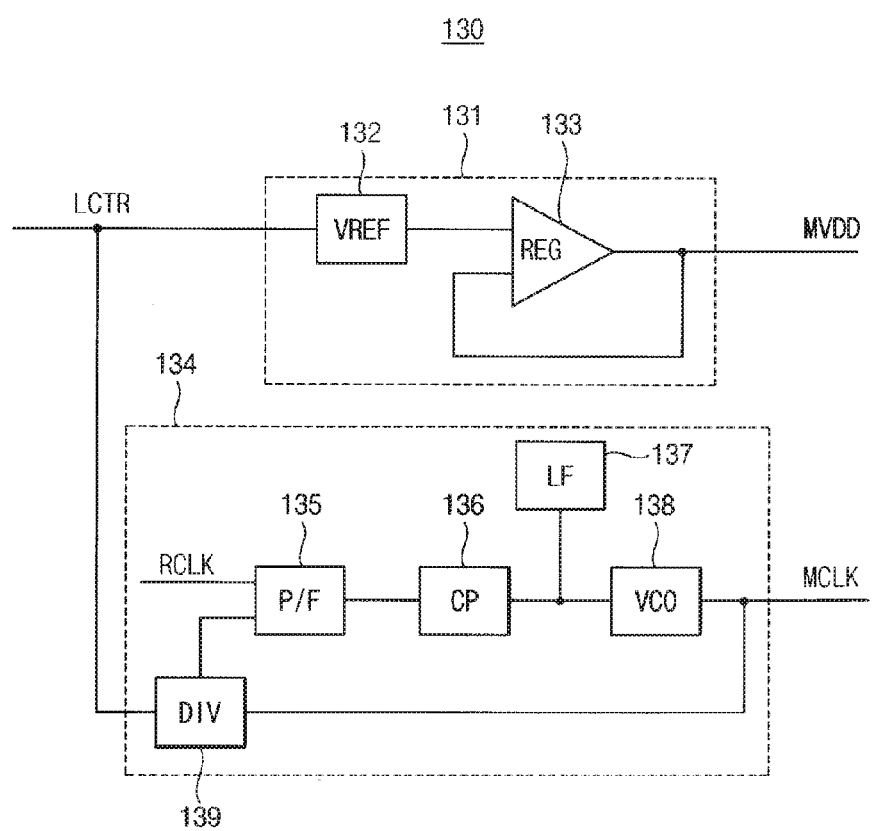
FIG. 19 is a block diagram illustrating a voltage-clock provider in a power management device according to an exemplary embodiment.

FIG. 19 is a block diagram illustrating a voltage-clock provider 130 in a power management device according to an exemplary embodiment. Referring to FIG. 19, the voltage-clock provider 130 may include a voltage control unit 131 and a clock control unit 134.

The voltage control unit 130 may include a reference voltage generator 132 and a regulator 133. In this case, the level control signal LCTR provided from the power management unit 120 may be applied to the reference voltage generator 132. Accordingly, the reference voltage generator 132 may adjust a reference voltage corresponding to the level control signal LCTR to provide the reference voltage to regulator 133. The regulator 133 may compare the adjusted reference voltage with the magnitude of the main power voltage MVDD which is fed back. The regulator 133 may provide the microprocessor 210 with the main power voltage MVDD, the magnitude of which corresponds to the level control signal LCTR. The clock control unit 134 may be implemented by a phase locked loop (PLL). In this case, the level control signal LCTR provided from the power management unit 120 may be applied to a frequency divider 139, and the frequency divider 139 may output a frequency-divided clock signal generated by dividing the frequency of the main clock signal MCLK based on a frequency division ratio corresponding to the level control signal LCTR. A phase/frequency detector 135 may compare a reference clock signal RCLK with the frequency-divided clock signal to generate an up/down signal. A charge-pump 136 may generate a control voltage based on the up/down signal. A voltage-controlled oscillator 138 may generate the main clock signal MCLK in response to the control voltage filtered by a loop-filter 137 to provide the main clock signal MCLK to the microprocessor 210. As described above, the magnitude of the main power voltage MVDD and/or the frequency of the main clock signal MCLK may be adjusted by adjusting the output of the reference voltage generator 132 and/or the frequency division ratio of the frequency divider 139. As a result, the power level of the microprocessor 210 may be changed based on the level control signal LCTR. It is understood, however, that the structure of the power-clock provider 130 is not limited thereto.

Figure 20:
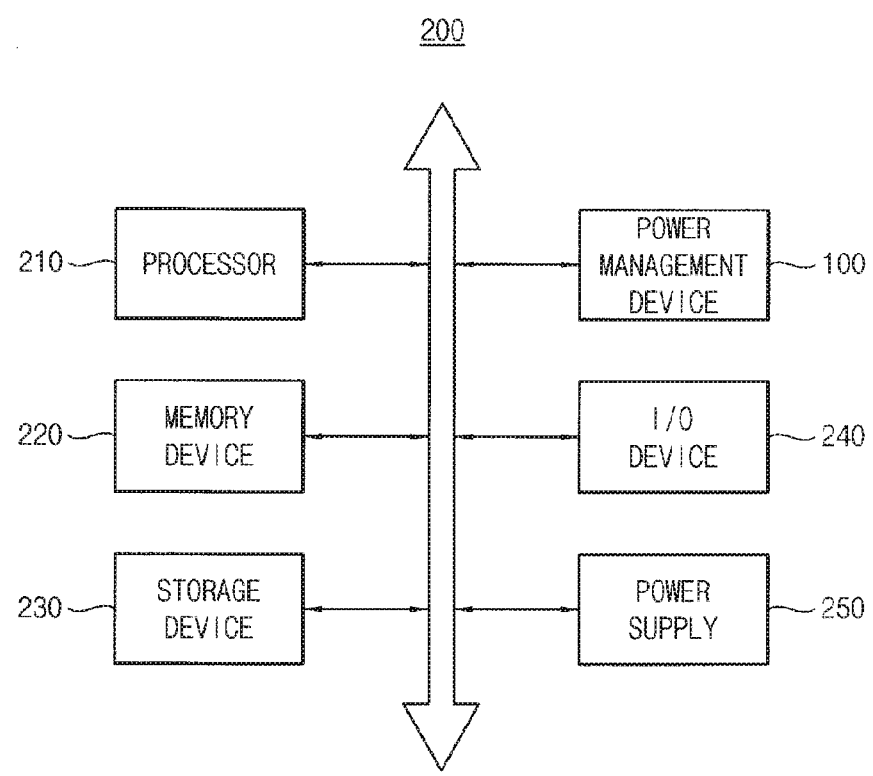
FIG. 20 is a block diagram illustrating an electric device having a power management device according to an exemplary embodiment.

FIG. 20 is a block diagram illustrating an electric device 200 having a power management device 100 according to an exemplary embodiment. Referring to FIG. 20, the electric device 200 may include a microprocessor 210, a memory device 220, a storage device 230, an input/output device 240, a power supply 250, and a power management device 100. In addition, the electric device 200 may further include a plurality of ports for communicating with at least one of a video card, a sound card, a memory card, a USB device, other electric devices, etc.

The microprocessor 210 may perform various computing operations, for example, executing specific software for performing specific calculations and/or tasks. For example, the microprocessor 210 may correspond to a central process unit (CPU), a digital signal processor (DSP), etc. The microprocessor 210 may be coupled to an expansion bus, for example, a peripheral-component-interconnect (PCI) bus. The microprocessor 210 may receive the main clock signal MCLK and the main power voltage MVDD from the power management device 100, and may operate in synchronization with the main clock signal MCLK. The power management device 100 may perform a dynamic voltage and frequency scaling (DVFS) operation on the microprocessor 210. As described above, the power management device 100 may include the workload rate detector 110, the power management unit 120, and the voltage-clock provider 130. The power management device 100 may accurately predict the power level of the microprocessor 210 for a future duration period by exponentially decreasing a current duration period when an operation state of the microprocessor 210 is unstable in the current duration period (i.e., when the operation state of the microprocessor 210 is rapidly changed in the current duration period). Furthermore, the power management device 100 may prevent power consumption and performance degradation of the microprocessor 210 due to unnecessary power level changes by exponentially increasing the current duration period when the operation state of the microprocessor 210 is stable in the current duration period (i.e., when the operation state of the microprocessor 210 is gradually changed in the current duration period).

The microprocessor 210 may control the memory device 220, the storage device 230, and the input/output device 240. The memory device 220 may be coupled to the microprocessor 210 via a bus (e.g., an address bus, a control bus, a data bus, etc.). For example, the memory device 220 may be a dynamic random access memory (DRAM), a static random access memory (SRAM), and/or a non-volatile memory (e.g., an erasable programmable read-only memory (EPROM), an electrically erasable programmable read-only memory (EEPROM), a flash memory device, etc.). The storage device 230 may be a hard disk drive (HDD), a compact disk read-only memory (CD-ROM), a solid state drive (SSD), etc. The input/output device 240 may include at least one input device (e.g., a keyboard, a keypad, a touchpad, a mouse, etc.), and at least one output device (e.g., a printer, a LCD display, a speaker, etc.). The power supply 250 may supply a power voltage for the electric device 200.

An exemplary embodiment may be applied to an electric device such as a desktop computer, a laptop computer, a digital camera, a video camcorder, a cellular phone, a smart phone, a portable multimedia player (PMP), a personal digital assistant (PDA), a MP3 player, a navigation device, etc. The foregoing description is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A power management device comprising:
a workload rate detector configured to adjust a length of a duration period;
a power management unit configured to calculate a period workload rate in the duration period; and
a voltage-clock provider configured to adjust a power level, based on the period workload rate and/or based on an external command.

2. The power management device of claim 1, wherein the power level is adjusted to a reference power level.

3. The power management device of claim 1, wherein the voltage-clock provider is configured to adjust the power level of a processor.

4. The power management device of claim 1, wherein the workload rate detector is configured to nonlinearly adjust the length of the duration period.

5. The power management device of claim 1, wherein the workload rate detector is configured to detect a plurality of unit workload rates in the duration period, and is configured to adjust the length of the duration period based on a variation of the plurality of unit workload rates.

6. The power management device of claim 5, wherein the length of the duration period is exponentially decreased when a variation of the plurality of unit workload rates is greater than a reference value,
the length of the duration period is exponentially increased when the variation of the plurality of unit workload rates is less than the reference value, and
the length of the duration period is maintained when the variation of the plurality of unit workload rates is equal to the reference value.

7. The power management device of claim 5, wherein the power management unit is configured to calculate the period workload rate of the duration period, based on the plurality of unit workload rates and the length of the duration period.

8. The power management device of claim 7, wherein the duration period includes a plurality of unit periods, and
each of the plurality of unit workload rates is calculated during a corresponding unit period among the plurality of unit periods.

9. The power management device of claim 8, wherein the power management unit is configured to calculate the period workload rate in the duration period by calculating an active period and an idle period during each of the plurality of unit periods, and
the active period is a period during which a main clock signal is applied to a processor, and the idle period is a period during which the main clock signal is not applied to the processor.

10. The power management device of claim 1, wherein the length of the duration period is exponentially adjusted.

11. A power management device comprising:
a workload rate detector configured to nonlinearly adjust a length of a duration period;
a power management unit configured to calculate a period workload rate in the duration period; and
a voltage-clock provider configured to adjust a power level of a processor based on the period workload rate in the duration period.

12. The power management device of claim 11, wherein the workload rate detector is configured to detect a plurality of unit workload rates in the duration period, and is configured to adjust the length of the duration period based on a variation of the plurality of unit workload rates.

13. The power management device of claim 12, wherein the power management unit includes a calculation unit configured to receive the plurality of unit workload rates and to accumulate the plurality of unit workload rates to calculate the period workload rate.

14. The power management device of claim 11, wherein the power management unit includes a comparison unit configured to compare the period workload rate with a reference value.

15. The power management device of claim 11, wherein the power management unit includes a comparison unit configured to compare the period workload rate with a first reference value and to compare the period workload rate with a second reference value,
the voltage-clock provider is configured to increase the power level of the processor when the period workload rate is greater than the first reference value,
the voltage-clock provider is configured to decrease the power level of the processor when the period workload rate is less than the second reference value, and
the voltage-clock provider is configured to maintain the power level of the processor when the period workload rate is between the first reference value and the second reference value.

16. A power management device comprising:
a workload rate detector configured to detect a plurality of unit workload rates in a duration period, and to adjust a length of the duration period based on a variation of the plurality of unit workload rates;
a power management unit configured to calculate a period workload rate of the duration period based on the plurality of unit workload rates and the length of the duration period; and
a voltage-clock provider configured to adjust a power level based on the period workload rate.

17. The power management device of claim 16, wherein the workload rate detector is configured to nonlinearly adjust the length of the duration period.

18. The power management device of claim 16, wherein the power management unit includes:
a comparison unit configured to compare the period workload rate with a reference value and to generate a comparison signal; and
a state machine configured to receive the comparison signal and to provide a level control signal to the voltage-clock provider based on the comparison signal.

19. The power management device of claim 16, wherein the length of the duration period is adjusted between a reference maximum value and a reference minimum value.

20. The power management device of claim 16, wherein the length of the duration period is exponentially adjusted.

* * * * *